Oct. 17, 1933.  J. G. LANNING  1,931,164
POWER DRIVEN UNIT FOR FLUID PRESSURE SYSTEMS
Filed May 6, 1932  5 Sheets-Sheet 3

Inventor:
John G. Lanning,
by Emery Booth Varney & Townsend
Attys

Oct. 17, 1933.   J. G. LANNING   1,931,164
POWER DRIVEN UNIT FOR FLUID PRESSURE SYSTEMS
Filed May 6, 1932   5 Sheets-Sheet 4

Inventor:
John G. Lanning,

Oct. 17, 1933.     J. G. LANNING     1,931,164
POWER DRIVEN UNIT FOR FLUID PRESSURE SYSTEMS
Filed May 6, 1932     5 Sheets-Sheet 5

Patented Oct. 17, 1933

1,931,164

UNITED STATES PATENT OFFICE 1,931,164

POWER DRIVEN UNIT FOR FLUID PRESSURE SYSTEMS

John G. Lanning, Corning, N. Y.

Application May 6, 1932. Serial No. 609,639

27 Claims. (Cl. 230—56)

This invention relates to fluid pressure systems employing a storage tank or receiver to which fluid is forced by a pumping engine driven by an internal combustion engine, herein, for purposes of description, referred to generically as a gas engine, and contemplates the provision of controlling devices such that the gas engine, in response to a drop in pressure in the receiver, may be automatically started under the action of the same pumping engine functioning as a motor, followed automatically by its operation functioning as a pump as soon as the operation of the gas engine has been established, and subsequently by the automatic stoppage of the gas engine as soon as the pressure in the storage tank has reached the required point.

The invention is applicable to fluid pressure systems used for pumping and storing either water or other fluids and employing liquid pumping engines controlled as to the starting and stopping of the power mechanism by either the head of the liquid in the receiver or by air pressure derived therefrom, but in the embodiment of the invention submitted for illustrative purposes, the same is shown as applied to a compressed air system employing an air receiving tank and an air engine, which latter acts as a compressor after the gas engine is started but functions as an air motor in starting up the gas engine.

While the invention broadly contemplates other types of pumping engines and other power transmitting devices connecting the gas engine and the pumping engine, in the illustrative embodiment a mechanically simplified arrangement is secured by utilizing a reciprocating type of air engine, the piston of which is directly connected to the piston of the internal combustion engine, thereby avoiding the complication of intermediate rotating parts. In the specific form of the invention as disclosed, moreover, the power transmitting device is in duplex form, the compressor-motor unit comprising two reciprocating air engines arranged side by side, each of which is opposed to and arranged co-axially with a gas engine, the opposed gas engine and air engine pistons being directly connected by connecting rods to form two reciprocating power driven units, these units being coupled to move in opposed step so that the movement of one in one direction is accompanied by the movement of the other in the opposite direction.

The invention will be best understood by reference to the following description when taken in connection with the accompanying illustration showing one specific embodiment thereof, while its scope will be more particularly pointed out in the appended claims.

Figure 1:
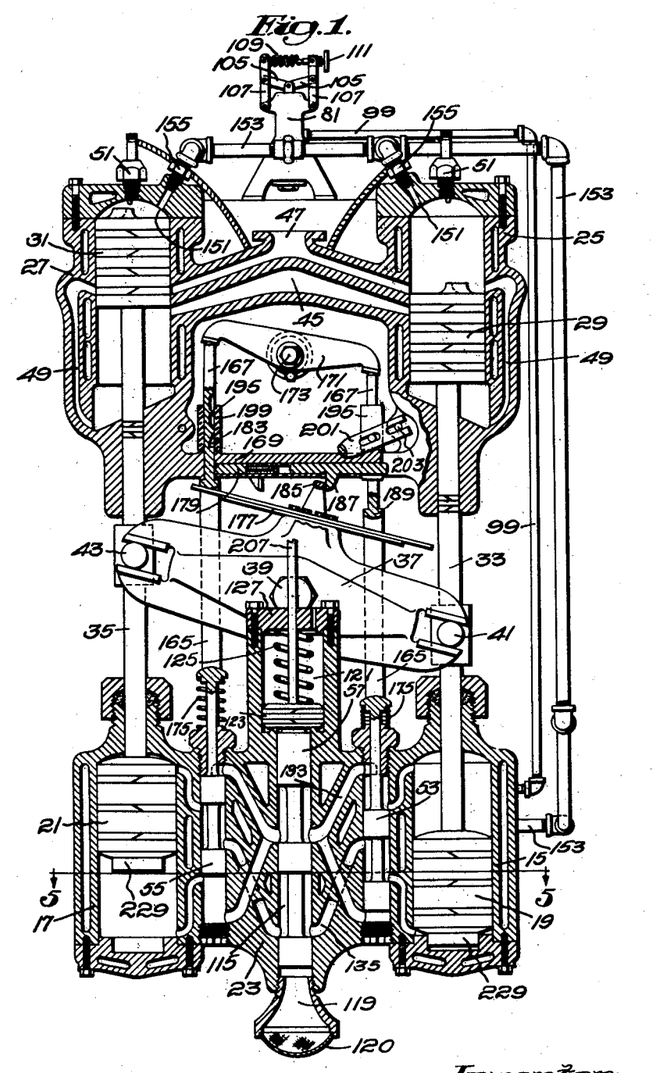
Fig. 1 is a central, sectional elevation showing one embodiment of the invention and illustrating the principal parts of the gas and air engines which appear in a section taken centrally through the two sets of cylinders, the parts being there shown in the positions occupied when the air engine is functioning as a motor.
Figure 2:
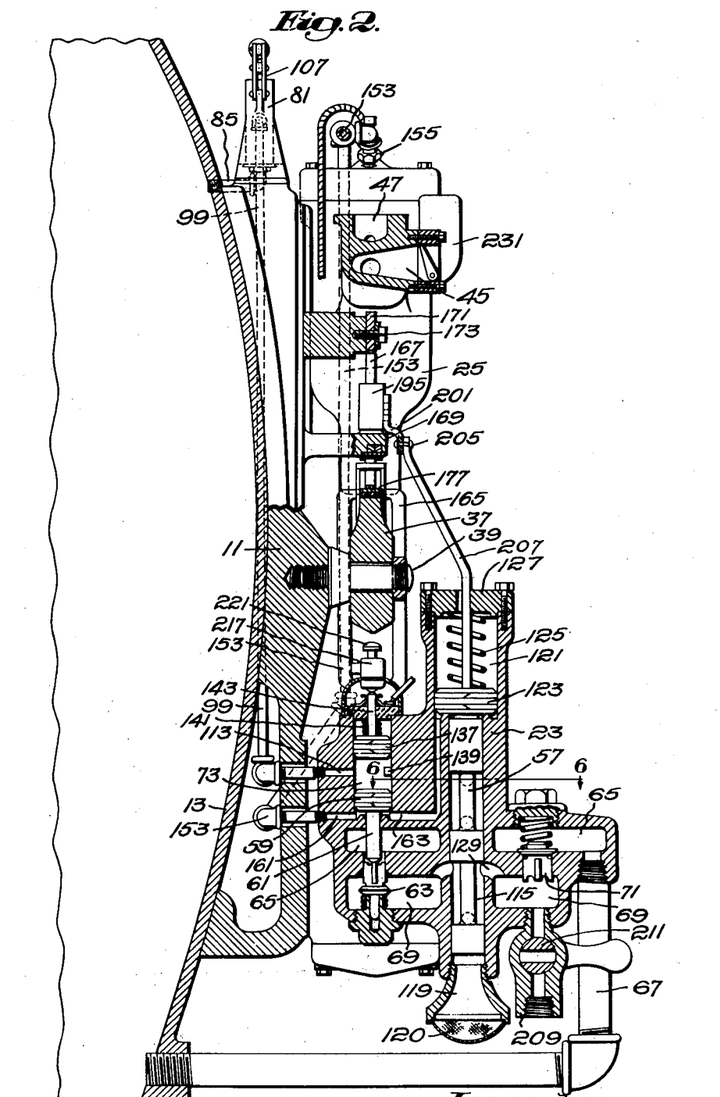
Fig. 2 is a sectional elevation taken transversely through the middle of the structure shown in Fig. 1 and showing also a portion of the receiver wall.

Referring to the embodiment of the invention shown in the drawings, and more particularly to Figs. 1 and 2, the structure comprises a bed plate 11 (Fig. 2) secured to the wall 13 of the air receiver. A portion only of the air receiver is shown but it provides a closed tank adapted to store the air under pressure and there maintain it in readiness to be drawn on from time to time for any desired purpose.

To the lower end of the bed plate there is secured a casting in which are formed the two air engine cylinders 15 and 17 arranged in parallelism, closely adjacent, and containing the reciprocatory pistons 19 and 21, the casting being so shaped as to provide between the cylinders (see Fig. 5) an intermediate body structure 23 in which are located the various ports and passages and the several valves and controlling devices for controlling the functioning and action of the air engine, as hereinafter described.

To the upper part of the bed plate there is secured a second casting in which are formed the two gas engine cylinders 25 and 27 containing the reciprocatory pistons 29 and 31, these cylinders, as well as the air engine cylinders, being surrounded by a water jacket, the cylinders 15 and 17, respectively, and the gas engine pistons 29 and 31 being directly connected to the air engine pistons 19 and 21, respectively, by the connecting rods 33 and 35.

While the air and gas engines for simplicity are shown as attached to the receiver, this relationship is immaterial as bearing on the subject-matter of the invention, since obviously a receiver of any desired form may be employed and located more or less remotely from the engines.

The connecting rods 33 and 35 are operatively connected by the walking beam 37 pivoted at 39 midway between the rods on the bed plate 11 and having slots at each opposite end, one of which is in close sliding engagement with a pin 41 on the rod 33 and the other with a pin 43 on the rod 35, the arrangement and connection being such that a movement of one pair of rod-connected pistons in one direction is accompanied by a movement of the other pair in the opposite direction.

The gas engines herein shown are of a conventional two-cycle type, being supplied with a gaseous fuel mixture from a common admission port 45 and having the common exhaust port 47, each cylinder having a by-pass port 49 and provided with spark ignition plugs 51 located in the cylinder head of each cylinder to provide the required ignition for the charge when compressed at the upper part of the cylinder. While the use of a two-cycle type of gas engine lends itself to simplification, the invention is not limited to any particular type of internal combustion engine, and an engine of the Diesel, the semi-Diesel, four-cycle, or other type may be employed in place of one of the two-cycle type.

Figure 8:
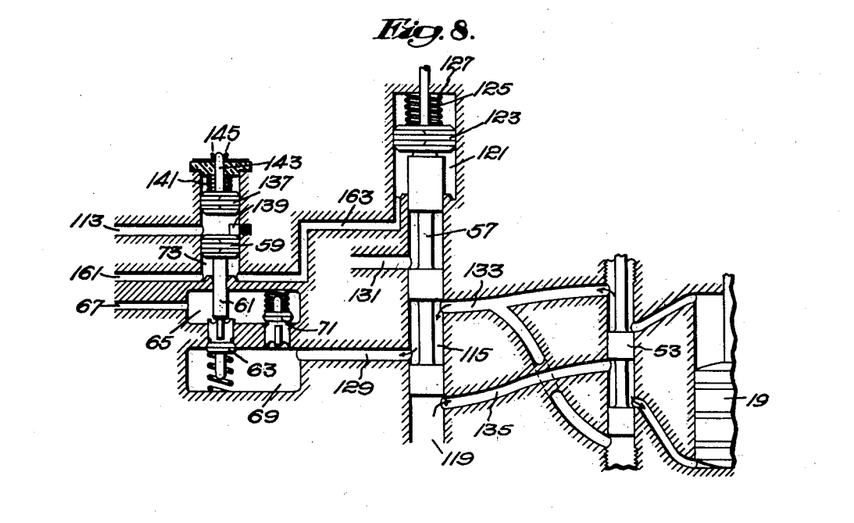
Fig. 8 is a diagrammatic representation showing the secondary control and ignition control devices with the reversing valve in the positions occupied when the engine is driven by the gas engine and operating as a compressor, these parts being shown in connection with the reciprocatory control valve of one of the compressor units and with certain interconnecting ports and passages.
Figure 9:
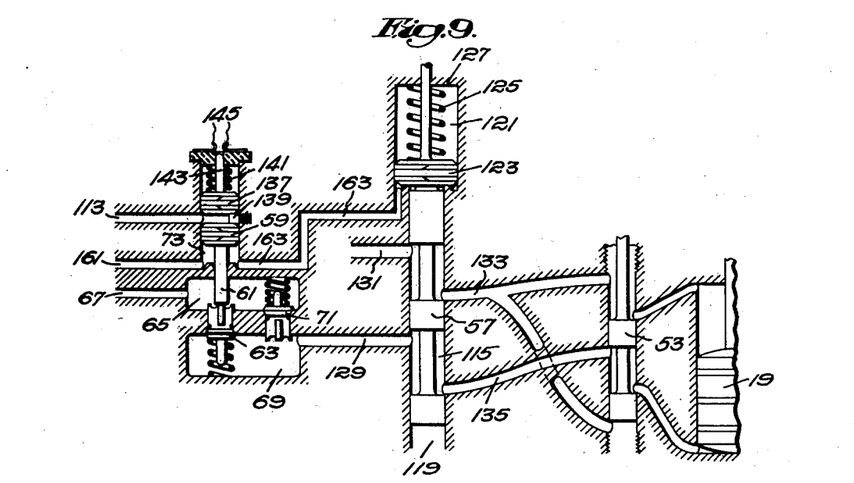
Fig. 9 is a similar diagrammatic representation showing the corresponding parts when the gas engine is stationary and the air engine is in readiness to start functioning as a motor in response to a drop in the receiver air pressure.
Figures 10, 11, 12:
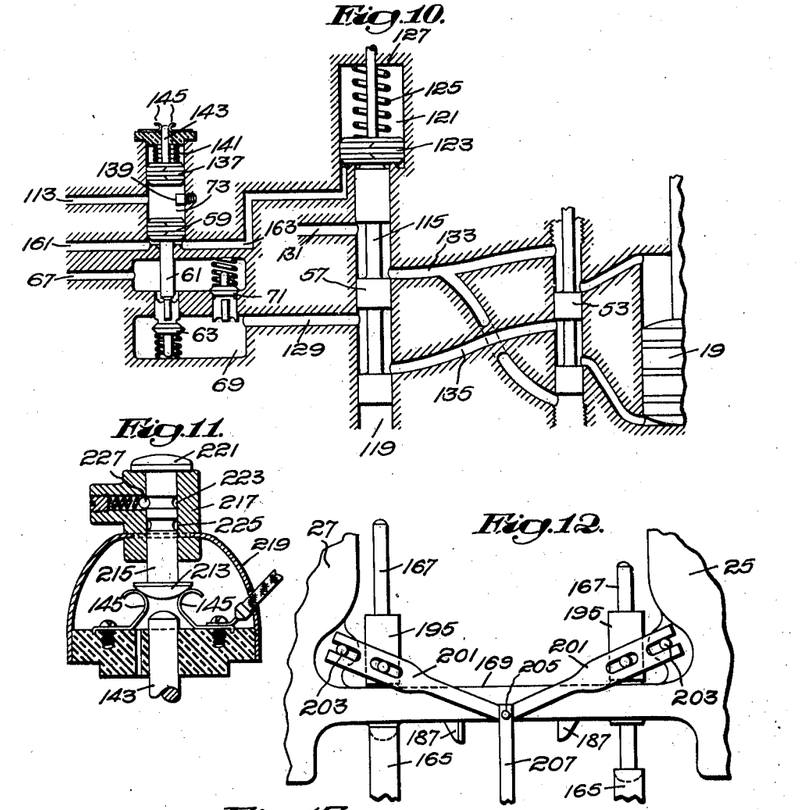
Fig. 10 is a similar diagrammatic representation showing the corresponding parts when the air engine is functioning as a motor to start the gas engine.
Fig. 11 is an enlarged sectional detail showing the attachment for manually closing the ignition circuit.
Fig. 12 is a detail showing the lever connections for adjustably changing the ignition timing.
Figure 13:
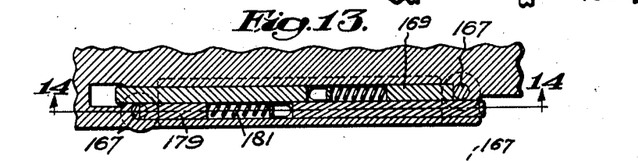
Fig. 13 is a sectional plan, on the line 13—13 in Fig. 14, showing the details of the detents governing the action of the air engine controlling valves.
Figure 14:
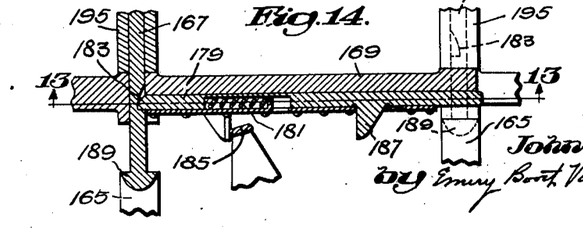
Fig. 14 is a sectional elevation of the same parts taken on the line 14—14 in Fig. 13.

The flow of air to and from the opposite ends of the air cylinders 15 and 17 is controlled by reciprocatory piston valves actuated coordinately by and with the movements of their respective pistons, the cylinder 15 being controlled by the valve 53 and the cylinder 17 by the valve 55, these together with their cylinder connecting ports being shown in Fig. 1 and the valve 53 with its ports also in the diagrammatic views in Figs. 8, 9 and 10.

The action of the piston valves 53 and 55 in causing their respective air engines to function as compressors or motors, as the case may be, is determined by the position of a vertically movable reversing valve 57 of the piston type (Figs. 1 and 2) and by a secondary control device, both of which are arranged within the body structure 23 between the two cylinders.

The secondary control device is in the form of a piston 59 with a depending plunger 61 which rests upon the top of a downwardly opening check valve 63 (Fig. 2). As will appear from Figs. 2 and 5 (see also Figs. 8, 9 and 10), the body structure is formed to provide a receiving chamber 65 which is in open communication with the air-storage tank or receiver 13 through the pipe connection 67 (Fig. 2). Immediately beneath the receiving chamber 65 there is provided an intermediate air chamber 69 into which air under pressure (as will more fully appear) is delivered by the air engines when functioning as compressors, the compressed air passing up into the air receiving chamber 65 through the check valve 71, the latter spring pressed against its seat in the chamber 65, thence passing directly into the receiver through the pipe 67. The check valve 63 in the intermediate chamber 69 is pressed up against its seat by the pressure of a retaining spring which is sufficient to hold it closed against the effect alone of the receiver air pressure in the chamber 65. The piston 59 is vertically movable in a cylindrical chamber 73 separated from the receiving chamber 65 by a wall of the casting through which the plunger 61 protrudes. If the piston 59 is forcibly depressed, the plunger 61 forces the check valve 63 down against its retaining spring, causing it to open communication between the two chambers and permit receiver air to enter freely from the receiving chamber 65 into the intermediate chamber 69. This is the position of the piston 59, plunger 61, and check valve 63, as represented in Figs. 2 and 10.

With the foregoing explanation of the constructional features of the two chambers 65 and 69, an explanation of the action of the master control valve will be readily understood.

The casing 81 of the master control valve (Figs. 1 and 2) is secured to the top of the bed plate 11 and is provided with a cylindrical chamber (Fig. 3) in which there is vertically movable a piston valve 83, the top of the chamber being vented to the atmosphere and the bottom being in open communication with the receiver through the pipe 85. The valve has an inner chamber or passage 87 open to air receiver pressure at the bottom of the chamber and is provided with external circumferential grooves 89 and 91, the groove 89 being connected to the inner chamber of the valve through ports 93. The valve casing is provided with ports 95 and 97, the first connected to the pipe 99 and the second constituting an open vent to the atmosphere.

A spring 101 tends to depress the valve against the opposing air pressure of the receiver, the spring being of such strength that when the receiver pressure drops below the predetermined minimum desired, the valve is forced to its lowermost position, this (as will more fully appear) serving to start up the gas engines, replenish the air in the receiver, and raise the pressure thereof.

The upper end of the valve carries the protruding plunger 103 connected to the toggle links 105, the ends of which are jointed to pivoted arms 107 drawn toward each other by the spring 109, the tension of which may be adjusted by the adjusting screw 111.

By suitably proportioning the relative strengths of the springs 101 and 109, the control valve may be thrown under any desired differential between the maximum and minimum pressures desired in the receiver. With the valve in its lowermost position, on a rise in receiver pressure, following the continued operation of the compressor, the upward movement of the valve is opposed by the joint action of the compression spring 101 and the tension spring 109, the valve moving higher and higher, while the ports 93 still remain in communication with the pipe 99. When it reaches a point where the toggle links assume and pass their straight line or critical position, the effect of the spring 109 is reversed and added to that of the air pressure in opposing the spring 101, the toggle links then snapping up and the valve being thereby drawn to its uppermost position in which the port 95 and the pipe 99 are cut off from the port 93 and from receiver air pressure and are at the same time placed in communication with the air vent passage 97 through the port 91.

On the other hand, with the valve in its uppermost position, when the air pressure in the receiver drops below the required maximum, the toggle spring 109 assists the lowering air pressure in opposing the downward movement of the valve past the critical toggle position until the air pressure drops below the predetermined minimum, whereupon it adds its effect to that of the spring 101, the toggle links snap downward into the position shown in Fig. 3, and the valve is again moved to its lowermost position, again connecting the pipe 99 with the receiver air pressure.

The pipe 99 extends down from the valve casing 81 and communicates with a port 113 in the side of the body casting 23 which opens into the chamber 73 above the plunger 59. Accordingly, with the master control valve in its lowermost position, the receiver air pressure is applied to the top of the plunger 59, but with the valve in its uppermost position the space above said plunger is vented to the atmosphere.

The operation of the control will be best understood by first assuming that the power units are at rest, with a receiver air pressure above the predetermined minimum and the master control valve in its uppermost position. The pipe 99 and the port 113 is then vented to the atmosphere, the plunger 59 of the secondary control being held in its uppermost position by the closed check valve 63, as indicated in the diagrammatic showing in Fig. 9 and the reversing valve 57 is in its down position as there shown.

Figure 3:
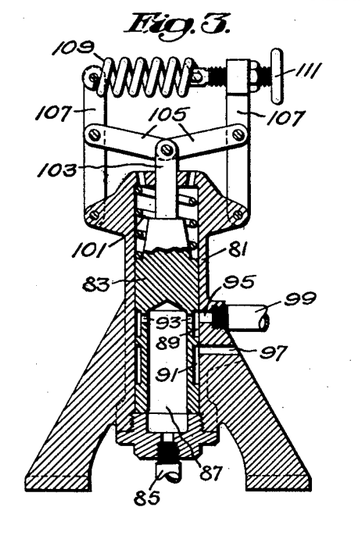
Fig. 3 is a central, sectional elevation on a larger scale showing the master control valve which is responsive to the air pressure in the receiver.
Figure 4:
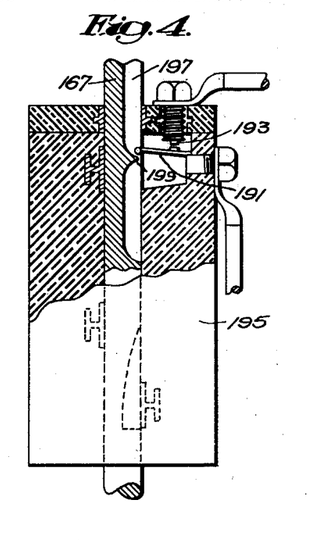
Fig. 4 is a sectional elevation on an enlarged scale showing the adjustable contacts for varying the timing of the ignition.

If air is then withdrawn from the receiver to an amount sufficient to drop the pressure therein below the predetermined minimum, the master control valve responds by moving to its lowermost position as shown in Fig. 3. On the depression of the master control valve, following the drop of pressure in the receiver, air pressure is applied through the pipe 99 and port 113 to the top of the plunger 59, forcing it downwardly against the spring pressed check valve 63, as indicated in Figs. 2 and 10, opening communication between the receiver and the intermediate air chamber 69, which communication is maintained so long as the air engines are required to function as motors, that being the condition represented in Fig. 10.

The piston reversing valve 57 is movable in a cylindrical chamber 115, the bottom of which, as shown in Fig. 1, is open to the atmosphere through the air admission port 119 covered by the air strainer 120, the upper portion of which chamber terminates in an enlarged bore 121, the valve being connected to a piston 123 which is movable in the bore 121. Under the conditions indicated, the piston 123 and the reversing valve rigidly connected thereto are held in the lowermost position indicated in Figs. 1, 2 and 10 by means of the compression spring 125 interposed between the piston 123 and the head 127 of the cylindrical bore.

The intermediate air chamber 69 is connected by a port or ports 129 with the reversing valve chamber 115, the latter being also provided with the exhaust port or ports 131 (Fig. 6) opening directly into the atmosphere. The chamber for the air engine controlling valve 53 (see Figs. 1, 8, 9 and 10) is connected at its opposite ends through diverging passages to the air discharge port 133 which communicates with the reversing valve chamber at a point between the ports 129 and 131, and is also connected at a point intermediate said converging passages through an air admission port 135 with the reversing valve chamber at a point near the lower end thereof.

Similar and duplicate ports and passages (as will be seen from Fig. 1) are provided between the reversing valve chamber and companion valve chamber for the air engine control valve 55.

With the master control valve depressed, therefore, the parts assume the position shown in Fig. 10, and receiver air passes from the receiver chamber 65 directly to the intermediate receiver chamber 69 through the check valve 63, thence through the port 129 and reversing valve chamber 115 into the air admission port 135. On the other hand the air discharge port 133 is open to the exhaust port 131. The particular air engine piston, which at that time is in its lowermost position, as, for example, piston 19, will thereupon have compressed air admitted beneath it, the air at the opposite end of the cylinder being exhausted through the air discharge port 133, the valve 53, through its control mechanism hereinafter described, having been moved to its extreme low position at or about the time the piston 19 reaches its lowermost position. Reverse air conditions pertain in the companion air engine cylinder, that is to say, air is admitted to the top of the cylinder and exhausted from the bottom. The air engine, therefore, immediately stops to operate as an air motor.

Simultaneously with the downward movement of the master control valve, the ignition circuit for the gas engine is closed. This is accomplished by the provision of a piston 137 movable within the cylindrical bore 73 immediately above the piston 59 and normally held down against a stop pin 139 by a spring 141. The piston 137 carries a plunger 143 protruding through the vented cylinder head (the latter of insulating material) and adapted to provide a metallic connection bridging for the contacts 145 in the ignition circuit when the piston is raised through the application of receiver pressure through the port 113, but adapted to break such circuit when the piston is lowered on the withdrawal of that pressure, as will be hereinafter described.

As the compressor starts to function as an air engine, the gaseous mixture is drawn into the gas engine cylinders and there compressed and fired. As soon as the gaseous mixture above either gas engine piston 29 or 31 has been compressed and the charge fired, that gas engine piston will then move downward, assisting and adding its driving effort to that of the compressor and causing an upward movement of the companion gas engine piston with a subsequent compression and firing of its charge, this resulting in the starting up of both gas engine cylinders.

To again change the function of the air engines from that of the air motors into that of compressors when the gas engine has begun fully to function as a driving unit, means are provided for applying the pressure arising from the combustion of the compressed charge in the two gas engines to raise the secondary control plunger 59. This allows the check valve 63 to close and cut off communication between the air receiving chamber 65 and the intermediate air chamber 69, except through the check valve 71. The application of such pressure also serves to shift the position of the reversing valve 57 from that shown in Figs. 9 and 10 to that shown in Fig. 8. This opens the air admission port 135 to the external air through the admission opening 119, closes the exhaust port 131 and connects the air delivery port 133 through the port 129 to the intermediate air chamber and thereby to the air receiving chamber and receiver through the check valve 71.

Figures 5, 6, 7:
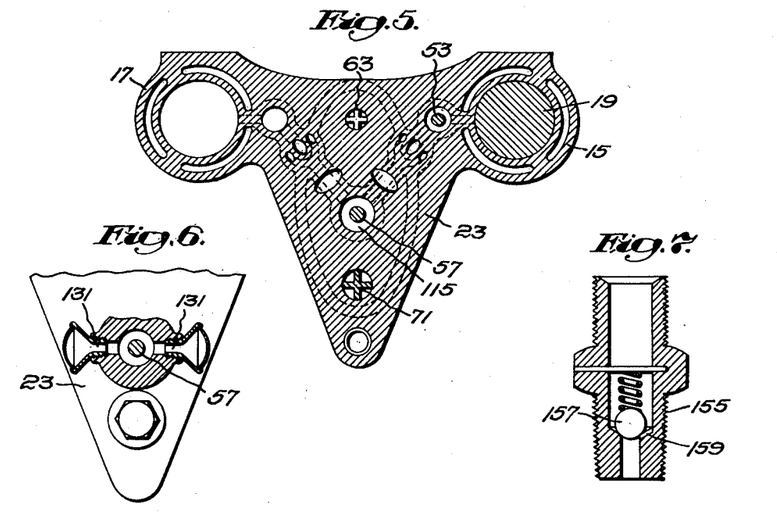
Fig. 5 is a section in plan taken on the line 5—5 in Fig. 1.
Fig. 6 is a section on the line 6—6 in Fig. 2 showing the exhaust port for the reversing valve chamber.
Fig. 7 is an enlarged sectional detail showing one of the check valves for the gas engine cylinder.

For this purpose the head of each gas engine cylinder is provided with a small port 151 (Fig. 1) communicating with a pipe 153 having branches extending to each cylinder, in which there is included a connection 155 containing a ball check valve 157 (Fig. 7). This valve is spring pressed to its seat to lift under pressure from within the gas engine cylinder, but is provided with a preferably minute by-pass 159 comprising a narrow slot formed in the seat of the valve. The opposite end of the pipe line 153 communicates with a port 161 opening into the chamber 73 at the bottom thereof and beneath the secondary control piston 59. The bottom of the chamber 73 also communicates through a port 163 with the chamber 121 beneath the piston 123 attached to the reversing valve 57. As soon as the gas engine, when driven by the air motor, starts to fire, the high pressure products of combustion pass into the pipe line 153, building up a pressure therein. This tends to raise the reversing valve against the compression spring 125 from the position shown in Figs. 1, 2, 9 and 10 into the position shown in Fig. 8 and to lift the secondary control pistons 59 also to the position shown in Fig. 8. The connecting passages between the chamber 73 and the check valve 157 are preferably so restricted, as at the port 161 or elsewhere, that the pressure is not effective for moving the pistons 59 and 123 until the gas engine has begun fully to function, as by the firing of several charges.

When this takes place the plunger 59 rises against the stop 139, allowing the check valve 63 to close. At the same time the reversing valve 57 lifts, reversing the air conditions in the air engine cylinders 15 and 17, these conditions being illustrated in Fig. 8. Referring to Fig. 8, it will be seen that the air admission port 135 is then open to the external air through the admission passage 119, the exhaust port 131 is closed and the air discharge port 133 communicates directly through the reversing valve chamber 115 and port 129 with the intermediate air chamber 69, conditions being thereby established such that the air engine driven by the gas engine functions as an air compressor, delivering compressed air to the receiver.

This condition pertains until the air pressure in the receiver reaches its predetermined maximum, whereupon the master control valve ascends to its highest position, thereby venting the chamber 73 beneath the piston 137 and allowing the latter to descend under the action of the compression spring 141, breaking the ignition circuit and stopping the engine.

With the stoppage of the engine the pressure fluid trapped in the pipe line 153, and which has been effective for raising the reversing valve, is gradually relieved by slow escape through the vents 159 in the check valves passing out through one or the other of the cylinders into the exhaust passage 47. The reversing valve is therefore returned from the position shown in Fig. 8 to its lowermost position, as shown in Fig. 9. The pressure at the same time is relieved below the secondary control piston 59. The various control parts accordingly assume the positions shown in Fig. 9, being left under such conditions that, in a subsequent reversal of the position of the master control valve, the apparatus will again start up as previously explained.

Referring now to the mechanism for controlling the movements of the air engine valves 53 and 55, and more particularly to Figs. 1, 2, 13 and 14, the valves are connected each to an upwardly extending valve actuating rod structure, including a yoke or bifurcated portion 165, in which the walking beam 37 is free to move, and a rod extension 167 which passes through and is guided in a cross-frame member 169 extending between the gas engine pistons. At their upper ends the rod extensions 167 are engaged loosely by the opposite ends of an equalizing lever or walking tappet 171 pivoted on the frame at 173, the valve rods being kept in engagement with the tappet by compression springs 175 which apply a lifting force to each rod structure just beneath the bifurcated portion thereof.

Secured to the upper face of the walking beam 37 is a single or multiple leaf spring 177 extending in opposite directions under and adapted to bear against the upper end of each valve yoke. When the piston of either of the air engine cylinders rises (its valve being then in its lowermost position), the valve yoke for that cylinder is engaged by the spring 177 which, as the piston continues to rise, applies an increasing lifting pressure to the valve rod structure. Movement of the latter, however, is prevented by a detent slide 179 mounted in the cross member 169 and forced by the spring 181 into a shouldered notch or recess 183 in the rod extension.

The valve rod structure continues to be held in its locked lower position by the detent until just before the piston reaches the end of its up movement. At or about that time a dog 185 carried at the upper end of the walking beam and having a swinging movement through an arc-like path engages a depending lug 187 on the detent slide, withdrawing the latter from engagement with the rod extension and allowing the latter to be thrown instantly to its upper position by the combined action of the leaf spring 177 and the compression spring 175, where it continues to be held by the action of the spring 175, with the shoulder 189 on the valve rod structure seated against an abutment in the crosspiece. Coincident with the up movement of the released valve rod, the position of the walking tappet 171 is reversed and the companion valve rod, which has been in its up position, is thereupon instantly thrown by the action of the tappet to its lowermost position, in which it is then locked and held by a detent slide, similar to that already described, and (Fig. 13) positioned at its side in the cross-frame member 169 but working in an opposite direction to function with the companion valve rod structure.

The valve rod structure last depressed remains locked in that position until its piston nears the completion of its up movement, whereupon it is released by the dog 185, again reversing the position of both controlling valves, the described action being repeated in each successive cycle of the operation of the air engine.

Means are also provided for automatically establishing a timing of the ignition during the starting cycle of the gas engine which is different from that established after the gas engine begins to function in driving the compressor, so that, if required, the ignition may be either advanced or retarded during the time the gas engine is being started by the air engine. In the illustrative embodiment of the invention this is accomplished coincidently with the movement of the reversing valve 57 and its connected piston 123, which latter acts to shift slightly the relative position of the ignition contacts and the contact making and breaking device for each cylinder, herein serving to advance the spark during the starting cycle of the gas engine.

Referring to the drawings, and more particularly to Figs. 1, 2, 4 and 13, the ignition circuit for each gas engine cylinder includes two normally open contacts 191 and 193 (Fig. 4) which are mounted in a breaker box 195 comprising a sleeve of insulating material and positioned (Figs. 1 and 2) just above the cross member 169 on the engine frame concentrically with the valve rod extension 167, which latter has sliding movement through a central aperture in the sleeve. The contact 193 is fixed, while the contact 191 is in the form of a spring contact, the end of which extends into a slot 197 in the rod extension, where it lies within the path of a circuit making and breaking cam point 199. When the valve rod rises with relation to the breaker box, the cam point 199 engages the free end of the spring contact, bringing the two contacts 191 and 193 together, making the ignition circuit. A further rise in the valve rod causes the cam point to ride over the end of the spring contact 191, whereupon the latter returns to its normal position, breaking the circuit and creating an igniting spark at the spark plug 51 in the corresponding gas engine cylinder. When the rod extension subsequently descends, the contact spring 191 is moved down with the cam point 199 until it rides over the latter and then assumes its normal position.

To change the timing between the starting and operating cycles of the gas engine, the breaker box may be adjustably moved vertically with relation to the valve rod extension 167. For this purpose each breaker box is connected by a pin and slot connection to a box supporting lever 201, one end of which is fulcrumed, also by a pin and slot connection, on the engine casing at 203. The levers of the two breaker boxes extend toward each other and at the median plane of the apparatus (Figs. 2 and 13) are both pivotally connected at 205 to the upper end of the generally upright rod 207, the lower end of which extends into the underlying chamber 121, where it is connected to the piston 123 to be moved therewith.

When the apparatus is at rest (Fig. 9) or when the air engine is functioning as a motor in starting the gas engine (Fig. 10), the piston 123 is in its lowermost position and the breaker boxes are likewise in their lowermost positions, or in some such relation as is represented in Figs. 1 and 2. As soon as the gas engine begins to function as a driving unit, and as already explained, the piston 123 rises to some such position as is indicated in Fig. 8, where it remains during further operation of the gas engine, this also lifting slightly the breaker boxes and retarding somewhat the timing of the ignition as related to its timing during the starting cycle. The degree of timing change effected may be obviously adjusted by changing the proportions or fulcrum points of the levers 201, and, if required, the timing may be advanced during the starting cycle by such a lever arrangement as will cause the lowering of the breaker boxes on the lifting of the piston 123.

In case it is desired to start the apparatus when the receiver is empty, a small auxiliary air pressure tank may be utilized, this being adapted to be connected directly to the intermediate air chamber 69 by the pipe connection 209 (Fig. 2) fitted with the control valve 211. This will serve to apply air pressure to start the gas engine, as heretofore described. In thus starting up the apparatus in this manner it is necessary to make some provision for completing the ignition circuit at the contacts 145, since, due to the empty receiver, the master control valve is then depressed and no pressure can be applied to raise the piston 137 or lower the piston 59. To this end there is provided (Fig. 11) a manually actuated contact closer comprising a contact bridging button 213 positioned directly above the contacts and carried by a vertically sliding pin 215 mounted in the block 217 of insulating material, the block being supported by the hood 219. The pin has a protruding head 221 above the block and may be depressed to the position shown in Fig. 11 by manual pressure on the head to cause the contact button to bridge the contacts 145. The pin has upper and lower circumferential grooves 223 and 225 adapted to receive a spring-pressed ball detent 227 mounted in the block, which detent enters the upper groove when the pin is depressed, holding it in that position and maintaining the circuit closed. When the piston 137 subsequently rises, the plunger 143 first duplicates the closure of the ignition circuit through the contacts 145 and then engages and lifts the button 213 out of engagement with said contacts, allowing the ball detent 227 to enter the lower groove 225 in the pin, the parts then assuming the position indicated in Fig. 2, maintaining the ignition circuit closed so long as the piston 137 remains lifted and placing the manually actuated circuit closer out of operative relation to the contacts until the head 221 is again depressed.

If desired, the vent for the chamber 73, instead of being associated with the check valves 155, may be located in the pipe line 153 to lessen any likelihood of pre-ignition of the charge compressed in either gas engine cylinder.

To absorb the shock of the initial firing of the gas engine cylinders there is provided a dash-pot in the form of a projection 229 on the bottom of each air engine piston, which projection enters a similarly shaped recess in the bottom of the air engine cylinder.

The operating speed of the compressor may be controlled by any suitable type of vacuum or velocity-controlled throttle governor 231 (Fig. 2) for the gas engine, and the employment is also contemplated of the usual devices (not shown) for circulating cooling water through the cylinder water jackets, such as a radiator, together with a plunger pump, which latter may be driven from the walking beam 37.

While I have herein shown for the purposes of illustration one specific application of the invention and one specific embodiment thereof, it is to be understood that various other applications may be made thereof and wide changes made in the form, construction and relative arrangement of the gas engines, pumps, controlling devices and other parts, all without departing from the spirit thereof.

I claim:

1. In an apparatus of the class described, a pair of power driven units comprising each a gas engine and a pumping engine and having their pistons connected to be reciprocated together, means connecting said units to cause them to reciprocate in opposed step, a receiver to store pressure fluid from said pumping engines, a connection between said pumping engines and receiver including a chamber to which pressure fluid is delivered by said pumping engines, a check valve normally closed but adapted to be opened to connect the receiver and chamber, a reversing valve for reversing the connections from the pumping engines to said chamber, means responsive to a drop in the receiver pressure to open said normally closed valve, thereby to drive said pumping engines as motors to start said gas engines, means responsive to the starting of said gas engines to move said reversing valve and to cause said normally closed valve to close, whereby said pumping engines function as pumps, and means responsive to a rise in receiver pressure to stop said gas engines.

2. In an apparatus of the class described, a pair of power driven units comprising each a gas engine and a pumping engine and having their pistons connected to be reciprocated together, means connecting said units to cause them to reciprocate in opposed step, a receiver connected to store pressure fluid received from said pumping engines, means for operating said pumping engines under fluid pressure to start said gas engines, means responsive to the starting of the gas engines to cause said pumping engines to function as pumps.

3. The combination with a gas engine having a cylinder and piston, of a pumping engine having a cylinder opposed to and co-axial with that of the gas engine and having its piston directly connected to that of the gas engine to reciprocate therewith, a receiver connected to the pumping engine to store pressure fluid received therefrom, means responsive to a drop in receiver pressure to apply stored receiver pressure fluid to impel the pumping engine as a motor to start the gas engine, means responsive to the starting of the gas engine to cause said pumping engine to function as a pump, and means responsive to a rise in receiver pressure to stop said gas engine.

4. The combination with a gas engine having a cylinder and piston, of a pumping engine having a cylinder and piston, the latter being connected to said gas engine piston to reciprocate therewith, means to apply fluid pressure to said pumping engine to impel the latter as a motor to start the gas engine, and means responsive to the starting of the gas engine to cause said pumping engine to function as a pump.

5. The combination with a gas engine, of a pumping engine connected to be driven thereby, a receiver connected to the pumping engine to store pressure fluid from said pumping engine, connections between said pumping engine and said receiver including a chamber to which pressure fluid is delivered by said pumping engine, a check valve between said chamber and the receiver, a valve normally closed but adapted to be opened to connect the receiver and chamber, a reversing valve for reversing the connections from the pumping engine to said chamber, means responsive to a drop in the receiver pressure to open the normally closed valve, thereby to drive said pumping engine as a motor to start said gas engine, means responsive to the starting of said gas engine to move said reversing valve and to cause said normally closed valve to close, whereby said pumping engine functions as a pump, and means responsive to a rise in receiver pressure to stop said gas engine.

6. The combination with a gas engine, of a pumping engine connected to be driven thereby, a receiver connected to the pumping engine to store pressure fluid received therefrom, a reversing valve to reverse the connections between the pumping engine and the receiver to impel the pumping engine as a motor to drive and start the gas engine when the receiver pressure drops, and means responsive to the starting of the gas engine to move said reversing valve and cause the pumping engine to function as a pump.

7. The combination with a gas engine, of a pumping engine connected to be driven thereby, a receiver to store pressure fluid from said pumping engine connections between said pumping engine and receiver, including a chamber to which pressure fluid is delivered by said pumping engine, a check valve between the chamber and receiver, a normally closed valve responsive to a drop in receiver pressure below a predetermined minimum for opening said chamber to said receiver for the operation of said pumping engine as a motor to start said gas engine, and means responsive to the starting of the gas engine to cause the closing of said valve.

8. The combination with a gas engine, of a pumping engine connected to be driven thereby, a receiver connected to the pumping engine to store pressure fluid received therefrom, a pumping engine control device responsive to a drop in receiver pressure below a predetermined limit for applying stored receiver pressure fluid to impel the pumping engine as a motor to drive the gas engine for starting, a controlling device for simultaneously closing the ignition circuit for said gas engine, means responsive to the starting of the gas engine for moving the pumping engine controlling device to cause said engine to function as a pump, and means responsive to a rise in receiver pressure to a predetermined maximum to move said last named controlling device to open the ignition circuit.

9. The combination with a gas engine, of a pumping engine connected to be driven thereby, a receiver connected to the pumping engine to store pressure fluid received therefrom, means responsive to a drop in receiver pressure for applying the stored receiver pressure fluid to impel the pumping engine as a motor to drive and start the gas engine, means responsive to the starting of the gas engine to cause said pumping engine to function as a pump, and means responsive to a rise in receiver pressure to stop the gas engine.

10. The combination with a gas engine, of a pumping engine connected to be driven thereby, a receiver connected to the pumping engine to store pressure fluid received therefrom, means responsive to a drop in the fluid pressure for applying the stored receiver pressure fluid to impel the pumping engine as a motor to drive and start the gas engine, and means responsive to the starting of the gas engine to cause said pumping engine to function as a pump.

11. The combination with a gas engine, of a pumping engine connected to drive or be driven thereby, a receiver connected to the pumping engine to store pressure fluid received therefrom, and controlling means responsive to a drop in receiver pressure for applying the stored receiver pressure fluid to impel the pumping engine as a motor to drive and start the gas engine.

12. The combination with a gas engine having a cylinder and piston, of an air compressor driven thereby having a cylinder and piston to reciprocate therewith, a receiver for receiving air under pressure from the compressor, means responsive to a drop in receiver air pressure to apply air pressure to operate the compressor as an air motor to drive and start said engine, means responsive to the starting of said engine to cause the compressor to function as such, and means responsive to a rise in the receiver pressure to stop the engine.

13. The combination with a gas engine, of a pumping engine connected to be driven thereby, a receiver connected to the pumping engine, means responsive to a drop in receiver pressure to apply the stored receiver pressure fluid to impel the pumping engine as a motor to drive and start the gas engine, and means responsive to pressure arising from combustion of compressed charges in the gas engine for causing the pumping engine to function as a pump.

14. The combination with a gas engine, of a pumping engine connected to be driven thereby, a receiver connected to the pumping engine to store pressure fluid received therefrom, means responsive to a drop in fluid pressure for applying stored receiver pressure to impel the pumping engine as a motor to drive and start the gas engine, said means including a control valve responsive to fluid pressure in the receiver, said valve having means to oppose its movement until the critical pressure has been reached and then to assist such movement, and means responsive to the starting of the gas engine to cause said pumping engine to function as a pump.

15. The combination with a gas engine, of a pumping engine connected to be driven thereby, a receiver connected to the pumping engine to store pressure fluid received therefrom, means for applying stored fluid pressure to start said gas engine, a master control valve to control the starting and stopping of the gas engine, said valve being movable under variations in the fluid pressure of the receiver, and a spring-actuated toggle connection to the valve adapted first to oppose movement of the valve until the critical pressure has been reached, and then to assist such movement.

16. The combination with a gas engine with ignition means, of a pumping engine connected to be driven thereby, a receiver connected to the pumping engine to store pressure fluid received therefrom, means for applying stored pressure fluid to impel the pumping engine as a motor to start and drive the gas engine, means responsive to the starting of the gas engine to cause said pumping engine to function as a pump, said means including a reversing valve for reversing the connections to the pumping engine, and means movable simultaneously with the movement of the reversing valve for changing the ignition timing of the gas engine.

17. The combination with a gas engine with ignition means, of a pumping engine connected to be driven thereby, a receiver connected to the pumping engine to store pressure fluid received therefrom, means for applying stored pressure fluid to impel the pumping engine as a motor, means responsive to the starting of the gas engine to cause said pumping engine to function as a pump, and means coincidently to change the ignition timing of the gas engine.

18. The combination with a gas engine, of a pumping engine connected to be driven thereby, a receiver connected to the pumping engine to store pressure fluid received therefrom, means automatically responsive to a drop in receiver pressure for applying stored pressure fluid from the receiver to impel the pumping engine as a motor to start the gas engine, means simultaneously to close the ignition circuit thereof, a connection through which extraneous pressure fluid may be applied to drive the pumping engine as a motor when the receiver is empty, means for closing the ignition circuit independently of the pressure in the receiver, means responsive to the starting of the gas engine to cause the pumping engine to function as a pump, and means to open the ignition circuit and stop the engine when the receiver pressure reaches a predetermined point.

19. The combination with a gas engine, of a pumping engine connected to be driven thereby, a receiver connected to the pumping engine to store pressure fluid received therefrom, a connection through which stored pressure fluid may be applied to said pumping engine to operate the same as a motor to start the gas engine, means responsive to a drop in receiver pressure to close the ignition circuit for the engine, and manual means to close the ignition circuit for starting independently of the receiver pressure.

20. The combination with a gas engine having a cylinder and piston, of a pumping engine having a cylinder opposed to and coaxial with that of the gas engine and having its piston connected to that of the gas engine to reciprocate therewith, and means for causing the fluid pump piston alternately to drive or be driven by the gas engine piston.

21. The combination with a pair of power driven units comprising each a gas engine having a cylinder and piston, of a fluid pumping engine having a cylinder opposed to and coaxial with that of the gas engine and having its piston connected to that of the gas engine to reciprocate therewith, means connecting said units to cause the pairs of connecting pistons thereof to reciprocate in opposed step, and means for causing the fluid pump pistons to alternately drive or be driven by the gas engine pistons.

22. The combination with a gas engine, of a fluid pumping engine connected to drive or be driven thereby, a receiver connected to the pumping engine to store pressure fluid received therefrom, controlling means responsive to a drop in receiver pressure for applying the stored receiver pressure fluid to impel the pumping engine as a motor to drive and start the gas engine, and means responsive to the starting of the gas engine to cause the pumping engine to function as a pump.

23. The combination with a fluid pumping engine adapted to be operated either as a pump or a fluid motor, of a gas engine to which the pumping engine is connected to be driven thereby as a pump during such times as the gas engine is operated, controlling means for applying stored fluid pressure to impel the pumping engine as a motor to drive and start the gas engine, and means responsive to the starting of the gas engine to cause said pumping engine to function as a pump.

24. The combination with a fluid pumping engine adapted to be operated either as a pump or a fluid motor, of a gas engine to which the pumping engine is connected to be driven thereby as a pump during such times as the gas engine is operated, a receiver connected to the pumping engine to store fluid pressure received therefrom, controlling means for applying stored fluid pressure to impel the said pumping engine as a motor to drive and start the gas engine, and means responsive to a rise in fluid pressure in the receiver to stop the gas engine.

25. The combination with a reciprocatory fluid pressure engine adapted to be operated either as a pump or a fluid motor, of a gas engine to which the pumping engine is connected to be driven thereby as a pump during such time as the gas engine is operated, a receiver connected to the pumping engine to store fluid pressure received therefrom, and controlling means movable either to a position to establish the operation of the pumping engine as a motor for repeated reciprocations to drive and start the gas engine or to a position to establish the continued operation of the pumping engine as a pump for repeated reciprocations to deliver fluid pressure to said receiver, 26. The combination with a gas engine, of a pumping engine connected to be driven thereby, a receiver connected to the pumping engine to store pressure fluid received therefrom, a control device movable in response to a drop in receiver pressure for applying the stored receiver pressure fluid to impel the pumping engine as a motor to drive the gas engine for starting, and means responsive to the starting of the gas engine to move said control device to cause said pumping engine to function as a pump.

27. The combination with a gas engine, of a pumping engine connected to be driven thereby, a receiver connected to the pumping engine to store pressure fluid received therefrom, means for reversing the operation of the pumping engine to cause the latter to function as a motor in starting the gas engine, and means automatically to move said reversing means after the gas engine has been started to cause the pumping engine to function as a pump.

JOHN G. LANNING.